Patented Apr. 15, 1947

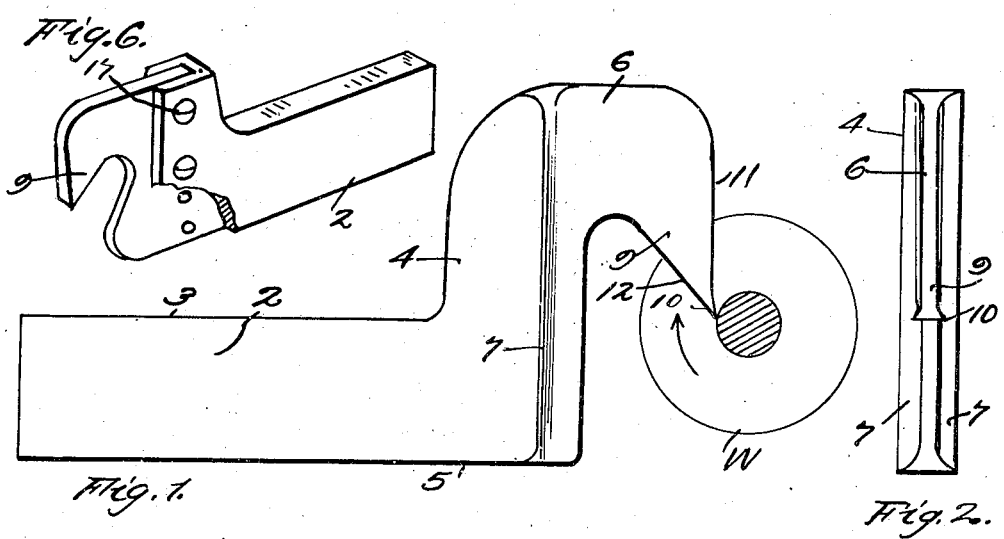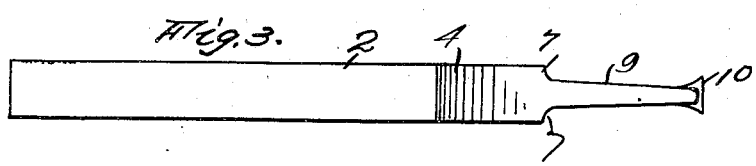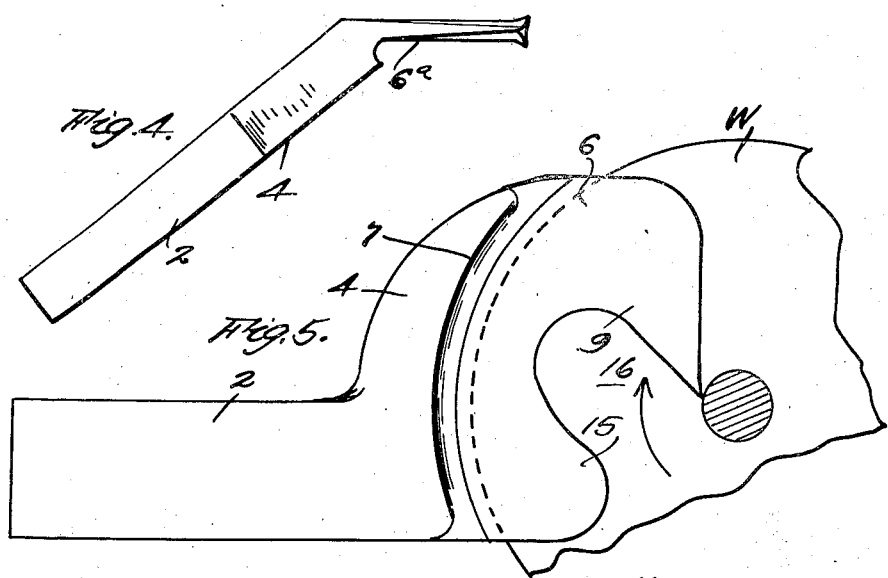

2,419,081

UNITED STATES PATENT OFFICE 2,419,081

CUTTER FOR MACHINE TOOLS

Harry F. Messenger, Pomona, Calif.

Application July 21, 1944, Serial No. 545,910

2 Claims. (Cl. 29—95)

This invention is a machine tool cutter for various kinds of cutting operations on metal or other hard material and may be used, practically, for turning, cutting-off, shaping and boring.

One object of the invention is to provide a highly efficient and safe cutter, and one that is capable of very deep cuts in given work; it being a purpose to provide a cutter whose characteristics are such as to give great strength and ample depth reach in the work.

Also, an object of the invention is to provide a cutter whose nib is so related to the shank that when the tool is set in a tool holder the cut is produced by a pulling reaction rather than by a push function of the nib.

A further object of the invention is to provide a cutter shank and bit structure especially effective when used with hard, insert, cutting blanks commonly employed in high speed machine tools.

Particularly, an object of the invention is to provide an integral shank and bit structure entirely free of intricate structural features so that the tool may be readily produced by simple forging operations at low cost of material, labor, time and preparatory requirements.

More directly, an object of the invention is to provide a straight shank tool having an integral goose-neck bit, and which latter may be embodied in coaxial arrangement with the shank or may be angled off to the right or to the left for setting close up to a lathe chuck face, for instance, from the right or the left sides.

The invention consists in certain advancements in this art as set forth in the ensuing disclosure and having, with the above, additional objects and advantages, and whose constructions, and details of features will be made manifest in the following description of the herewith illustrative embodiments; it being understood that modifications, variations and adaptations may be resorted to within the scope, spirit and principle of the invention as it is more directly claimed in the addendum.

Figure 1 is a side elevation, Figure 2 an end elevation, and Figure 3 a top plan of a preferred form of the cutter.

Figure 4 is a top plan of a cutter whose bit is angled off to one side from the fore end of its shank.

Figure 5 is a side elevation of a form of the cutter for making very deep cuts in the work; with safety.

Figure 6 is a perspective of a detachable bit and shank embodiment.

Figure 6A:
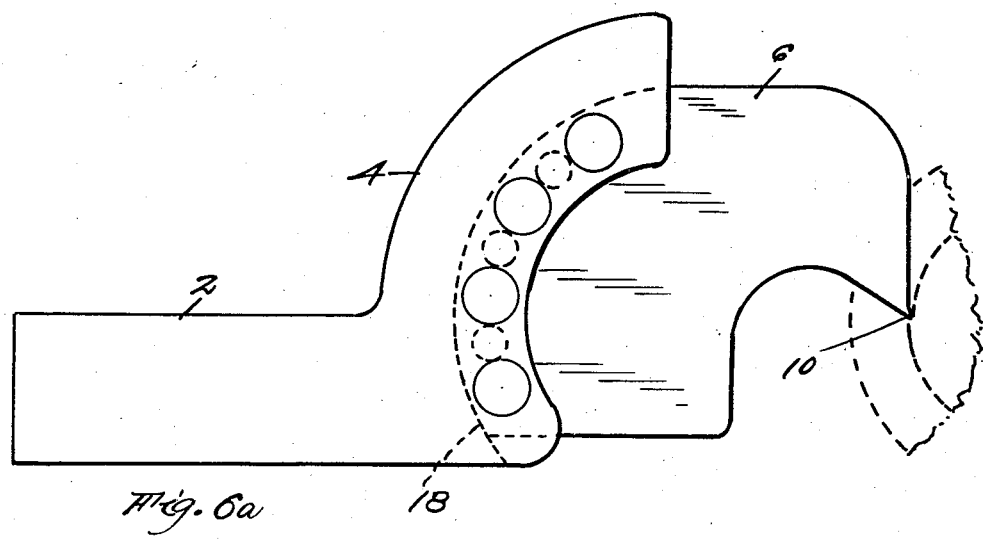
Figs. 6a and 7 show a wear take-up cutter.

As shown in Figs. 1, 2 and 3 the cutting tool involves a long, straight, deep and thick shank or body 2 which may be of any appropriate material adapted, generally, to be forged. Extending upwardly from what will be called the top edge 3 of the shank is a backbone portion 4 which is of the same thickness, preferably, as the shank 2; and this thickness extending from the top of the bit to the opposite bottom edge 5 of the shank.

Extending from the top of the backbone 4 and to the bottom of the shank, at its fore end, and in front of the backbone, is a flat, goose-neck bit cheek 6, in Fig. 3 on the axis of the shank and having a long neck of a thickness much less than that of the shank backbone so that side shoulders 7—7 are formed at the front of the backbone. It will be seen that by extending the backbone high up in the bit structure great strength is secured along the wall of the bit which is above the top edge of the shank.

The bit includes a beak part 9 all of which is disposed laterally of the projected top edge line of the shank and whose nib 10 is at a point near and preferably just above the said projected top line, and also as to the center of rotation of work W presented to the tool nib. The outer face or edge 11 of the nib is substantially perpendicular to the top edge line and is of such length to effect great strength not only to enable taking of a heavy cut of thick shaving but to substantially eliminate tool chatter. The beak presents a rake face 12 of suitable angle from its nib and when the tool is set in a tool holder (not shown) in the intended manner and the work is rotated or otherwise moved toward the nib this latter cuts by a pulling reaction into the material as clearly distinguished from tools of the type designed to push off a chip from the work.

Since the depth of work cut is limited by the depth of the bit cheek 6 back to the shoulders 7—7 it is desirable that the front shoulders 7—7 of the backbone be set as far back from the bit nip 10 as is practical and at the same time that the backbone be carried as far up and forward into the bit neck as may be possible. To that end Fig. 5 illustrates a form of the cutter in which the shoulder 7 (on each side of the bit) is concaved in an arc substantially on the work center and the backbone 4 is directed upwardly and forwardly on the beak 9 to give great stability to the top of the cheek. And in furtherance of security against cheek fracture this part is at its lower part projected forward in nose form 15 at the rake throat 16.

As shown in Fig. 4 the bit cheek is bent off from the line of the shank axis as at 6a to permit of the bit being set up close to the chuck of a machine tool, for instance; and this deflection may be either to the right or to the left from the shank, as desired. Otherwise the bit of this form is the same in goose-neck pattern as in Fig. 1.

Where desired the bit 6 may be removably affixed to the shank backbone as by screws 17, as for replacement or repair of the bit part. The cheek is provided with a row of numerous holes which enable the bit nib to be vertically adjusted as desired with respect to a given position of the screws 17 in the backbone.

Figure 7:
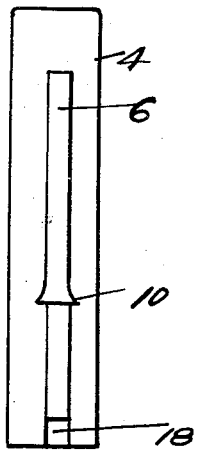

The cutter of Figs. 6a and 7 provides a cheek 6 whose rear edge is curved to fit in a curved seat groove 18 in the backbone 4 so that the nib of the cheek can be advanced by rotation of the cheek on the center of the groove 18.

In the several views, excepting Figs. 6, 6a and 7, the bit part 4 and cheek 6 are integral with the shank 2 of the cutter. It is understood that the nib 10 is wider than any portion of the cheek 6 and that this may be of various section-shape as shown.

What is claimed is:

1. A machine tool, cutting off cutter having a main shank whose front end has an integral, rigid, upwardly projecting, perpendicular limb 4 provided at its front perpendicular face with a long neck portion of less thickness than the thickness between the side planes of the said shank and forming long frontal shoulders 7 from top to bottom of the shank and its said limb, the neck having at its uppermost end a cutting bit of about the same thickness between side faces as the said neck and which bit points as a hook toward the projected axis of the shank.

2. The cutter of claim 1; there being a slot in the continuous end face of the shank and said perpendicular, upwardly projecting limb, and the said neck, with its bit, being shiftable in the slot perpendicularly as to the shank, and clamp screws passing through the slot walls to rigidly set the adjusted bit neck.

HARRY F. MESSENGER.

REFERENCES CITED

The following references are of record in the file of this patent:

UNITED STATES PATENTS

| Number | Name | Date |
|---|---|---|
| 1,067,104 | Fitzpatrick | July 8, 1913 |
| 1,373,258 | Nicholson | Mar. 29, 1921 |

FOREIGN PATENTS

| Number | Country | Date |
|---|---|---|
| 14,012 | Britain | June 17, 1913 |
| 712,117 | France | Sept. 25, 1931 |
| 459,194 | France | Oct. 29, 1913 |
| 718,805 | France | Jan. 29, 1932 |

OTHER REFERENCES

American Machinist, vol. 54, No. 20, p. 880. (Copy in Division 13.)